(12) United States Patent
Yang et al.

(10) Patent No.: US 6,505,375 B1
(45) Date of Patent: Jan. 14, 2003

(54) WINDSHIELD WIPER BLADE PROTECTOR

(76) Inventors: Hsin-Yi Yang, No. 473, Chin Hua Rd., Taichung (TW); Sheng-Long Wu, No. 105-1, Chung Hsi Lane, Chien Man Village, Kuo Hsing Hsiang, Nantou Hsien (TW)

( * ) Notice: Subject to any disclaimer, the term of this patent is extended or adjusted under 35 U.S.C. 154(b) by 0 days.

(21) Appl. No.: 09/918,992

(22) Filed: Jul. 31, 2001

(51) Int. Cl.$^7$ ................................ B60S 1/32; B60S 1/04
(52) U.S. Cl. ............................. 15/250.19; 15/250.001; 15/257.01
(58) Field of Search ..................... 15/250.19, 250.16, 15/250.351, 250.001, 257.01

(56) References Cited

FOREIGN PATENT DOCUMENTS

| JP | 58-63552 | * | 4/1983 | ............... 15/250.19 |
|---|---|---|---|---|
| JP | 59-100035 | * | 6/1984 | ............... 15/250.19 |
| JP | 61-50854 | * | 3/1986 | ............... 15/250.19 |
| JP | 62-71743 | * | 4/1987 | ............... 15/250.19 |
| JP | 7-186897 | * | 7/1995 | ............... 15/250.19 |
| JP | 10-71931 | * | 3/1998 | ............... 15/250.19 |
| JP | 2001-138871 | * | 5/2001 | ............... 15/250.19 |

* cited by examiner

*Primary Examiner*—Gary K. Graham
(74) *Attorney, Agent, or Firm*—William E. Pelton, Esq.

(57) ABSTRACT

A windshield wiper protector includes a protection actuating assembly connected to the wiper and a stationary lifting arm attached to the windshield. A roller is pivotally mounted on the top of the stationary lifting arm and an inclined drive plate is attached to the protection actuating assembly. The protection actuating assembly and the wiper will be lifted up when the wiper is moved to the original position due to the inclined drive plate.

6 Claims, 6 Drawing Sheets

WINDSHIELD WIPER BLADE PROTECTOR

BACKGROUND OF THE INVENTION

1. Field of the Invention

The present invention relates to a protector, and more particularly to a windshield wiper blade protector.

2. Description of Related Art

The wiper blade for a car windshield usually speedily hardens and deteriorates due to the high-temperature of the windshield caused by sunshine because the wiper blade always presses against the windshield of the car. Consequently, a windshield wiper blade protector to lift the wiper blade off the windshield to prevent the wiper blade from speedily stiffening and deteriorating has been marketed.

With reference to FIG. 5, the conventional windshield wiper blade protector (40) in accordance with the prior art comprises a clamp (41) and a support (42). The clamp (41) clamps a bracket (51) of a wiper (50) with a wiper blade (52). One end of the support (42) is pivotally connected to the clamp (41), and the other end is free to press against the surface of the windshield to force the clamp (41) away from the windshield to cause the wiper blade (52) to lift off the surface of the windshield.

With reference to FIG. 6, a torsion spring (43) is mounted between the clamp (41) and the support (42). A slot (411) is defined in one side of the clamp (41), and a protrusion (44) is formed on the support (42) to be selectively locked in the slot (411) in the clamp (41). The torsion spring (43) is twisted to store a restitution force when the protrusion (44) is locked in the slot (411) in the clamp (41). The protrusion (44) is removed from the slot (411) and moved laterally and upwardly to prevent the protector (40) from contacting the windshield when the wiper (50) is in use. The user must manually turn the support (42) to twist the torsion spring (43) and lock the protrusion (44) in the slot (411) after the wiper (50) has been used.

However, if the user forgets to twist the support (42) and lock the protrusion (44) in the slot (411), the conventional wiper protector (40) becomes useless because the wiper blade (52) presses against the windshield whether the wiper (50) is used or not. The conventional windshield wiper protector (40) needs to be altered advantageously.

The present invention has arisen to mitigate and/or obviate the disadvantages of the conventional windshield wiper blade protector (40).

SUMMARY OF THE INVENTION

The main objective of the present invention is to provide an improved windshield wiper blade protector that prevents the wiper blade from damage due to high temperature of the windshield caused by sunshine.

To achieve the objective, the windshield wiper blade protector in accordance with the present invention includes a protection actuating assembly connected to the wiper and a stationary lifting arm attached to the windshield. A roller is pivotally mounted on the top of the stationary lifting arm and an inclined drive plate is attached to the protection actuating assembly. The protection actuating assembly and the wiper blade will be lifted up when the wiper is moved to the original position as the inclined drive plate rides up on the roller.

Further benefits and advantages of the present invention will become apparent after a careful reading of the detailed description with appropriate reference to the accompanying drawings.

DETAILED DESCRIPTION OF THE INVENTION

Figure 1:
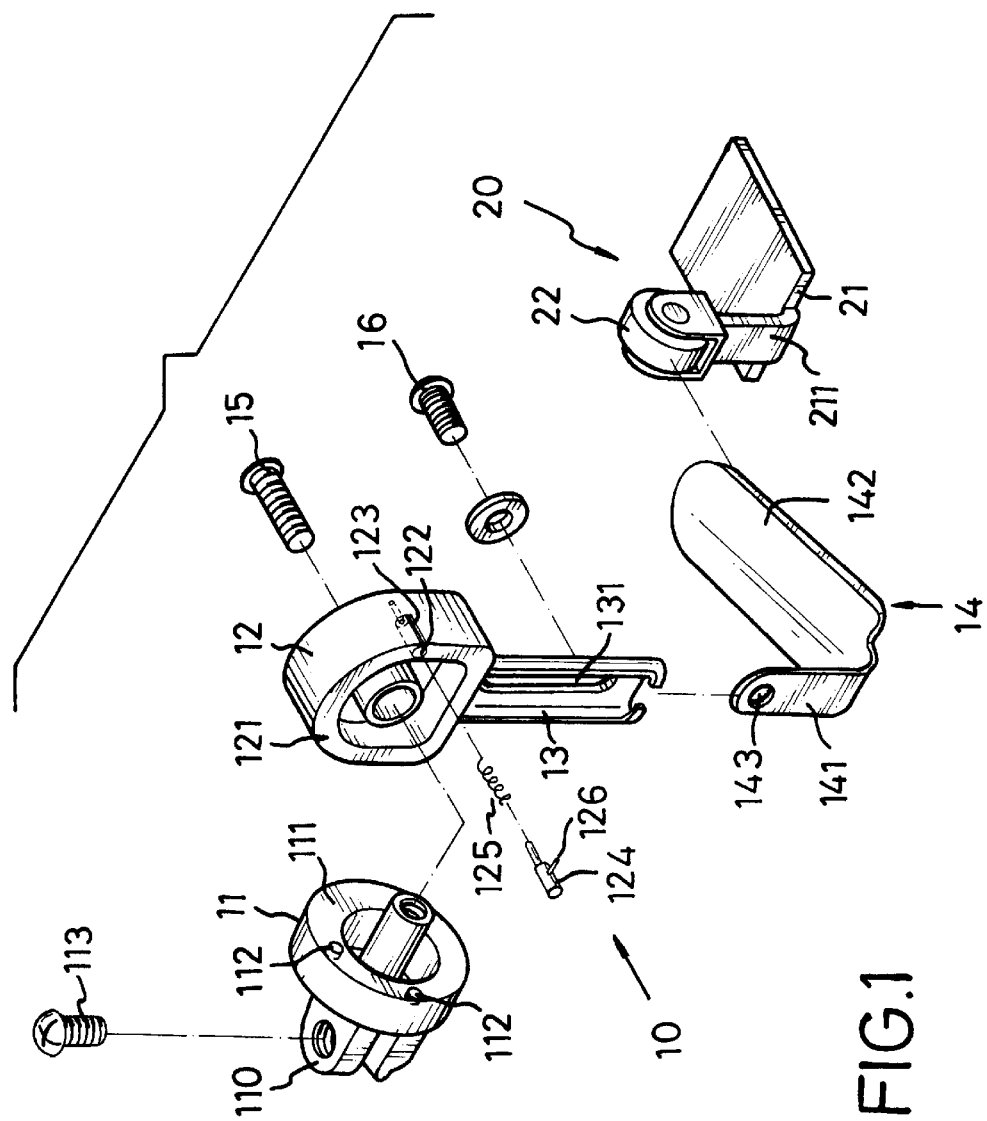
FIG. 1 is a side plan view of a windshield wiper blade protector in accordance with the present invention.
Figure 2:
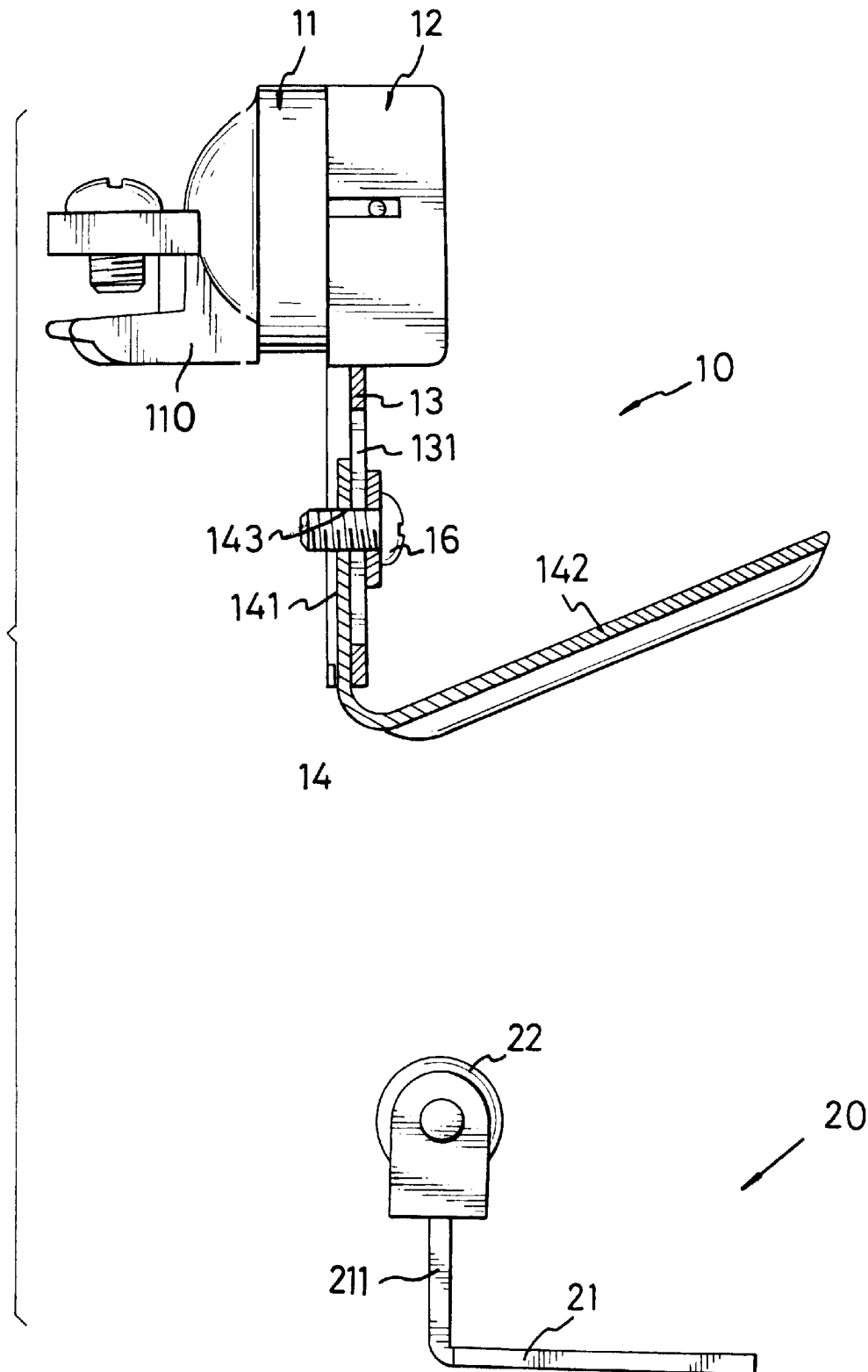
FIG. 2 is an exploded perspective view of the windshield wiper blade protector in FIG. 1.
Figure 3:
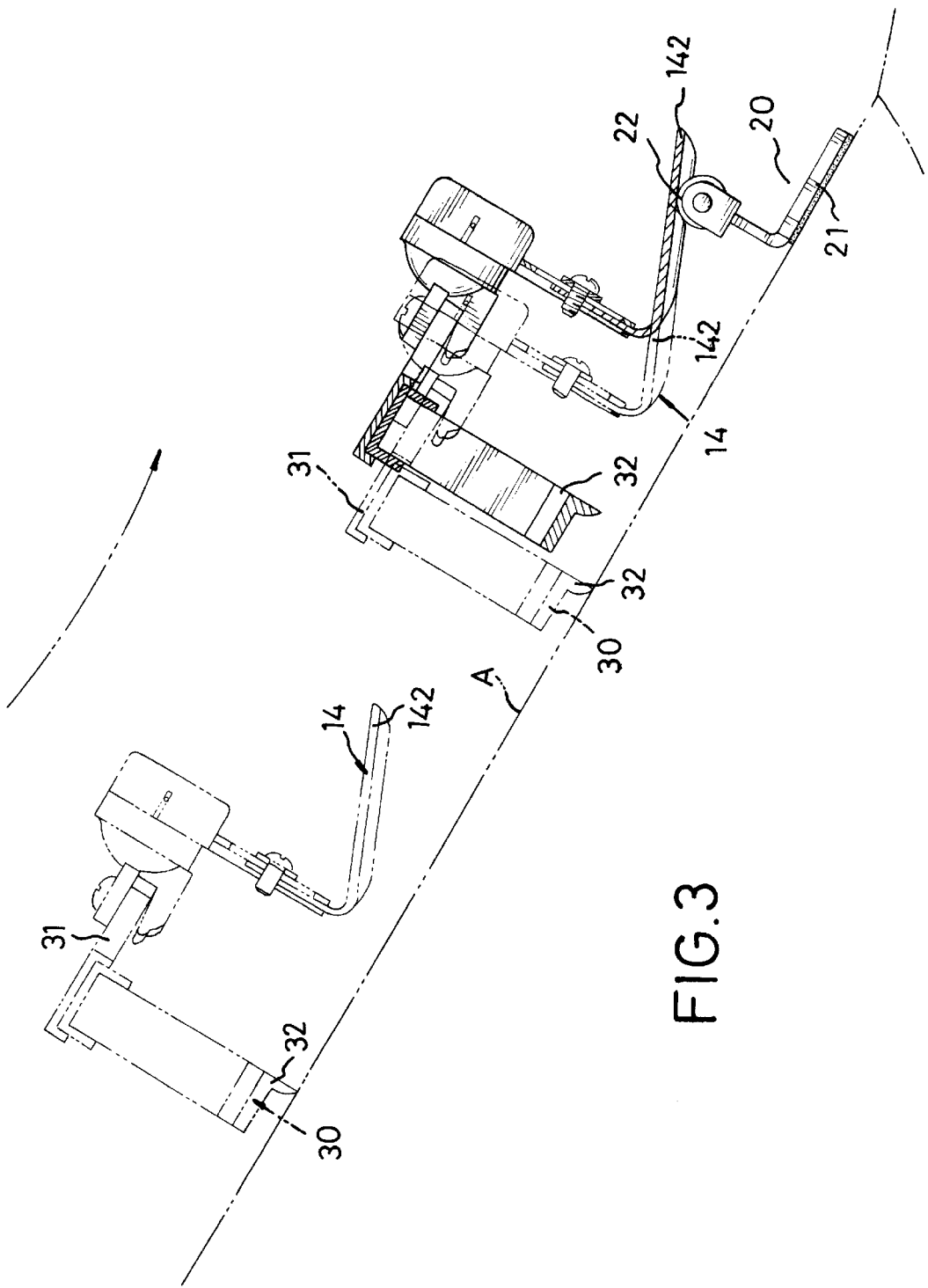
FIG. 3 is an operational side plan view in partial section of the windshield wiper blade protector in FIG. 1.

With reference to the drawings and initially to FIGS. 1–3, a windshield wiper blade protector in accordance with the present invention comprises a protection actuating assembly (10) and a stationary lifting arm (20). The protection actuating assembly (10) is adapted to be mounted on a windshield wiper (30) consisting of a bracket (31) and a wiper blade (32). The wiper blade (32) is mounted in the bracket (31) and presses against the surface of a windshield (A). The stationary lifting arm (20) is adapted to be attached to the windshield (A). The protection actuating assembly (10) rides up on the stationary lifting arm (20) to make the windshield wiper blade (32) lift off the surface of the windshield (A) when the protection actuating assembly (10) moves back to abut the stationary lifting arm (20).

The stationary lifting arm (20) comprises a base plate (21), an arm (211) and a roller (22). The base plate (21) is adapted to be attached to the windshield (A). The arm (211) extends perpendicular up from one side of the base plate (21) and has a free end. The roller (22) is rotatably mounted on the free end of the arm (211).

The protection actuating assembly (10) comprises a connecting block (11), a body (12) and a drive plate (14). The connecting block (11) is adapted to be connected to the windshield wiper bracket (31). The body (12) is movably attached to the connecting block (11). The drive plate (14) is attached to the body (12). A pair of parallel ears (110) extends from a face of the connecting block (11) opposite to the body (12), and the windshield wiper bracket (32) is inserted between the two ears (11). A bolt (113) is screwed through one of the ears (110) to press and hold the windshield wiper bracket (32) in place between the two ears (110). A flat face (111) is formed on the connecting block (11), and another flat face (121) corresponding to and facing the flat face (111) on the connecting block (11) is formed on the body (12). The flat faces (111, 121) slidably abut each other. A bolt (15) extends through the body (12) and is screwed into the connecting block (11) to hold the connecting block (11) in place on the body (12) after the flat faces (111, 121) are pressed against each other. A tongue (13) extends radially out from the body (12) and a slot (131) is longitudinally defined in the tongue (13).

The drive plate (14) is L-shaped and comprises a sliding arm (142) and a connecting arm (141). Both the sliding arm (142) and the connecting arm (141) have free distal ends and proximal ends joined together. The sliding arm (142) is provided to slide on the roller (22) of the stationary lifting arm (20). The sliding arm (142) and the connecting arm (141) form an acute angle because the free end of the sliding arm (142) projects slightly upward. The connecting arm (141) is attached to the tongue (13), and a threaded hole (143) is defined in the connecting arm (141) to correspond to the slot (131) in the tongue (13). A bolt (16) extends through the slot (131) in the tongue (13) and is screwed into the threaded hole (143) to hold the drive plate (14) in place.

The protection actuating assembly (10) is lifted away from the surface of the windshield (a) when the free end of the sliding arm (142) of the drive plate (14) contracts the roller (22) of the stationary lifting arm (20) as the wiper (30) approaches the original position because the sliding arm (142) is inclined relative to the windshield (A). Consequently, the wiper blade (32) is lifted off of the windshield (A) because the wiper (30) is attached to the protection actuating assembly (10) and the protection actuating assembly (10) is lifted away from the windshield (A) due to the inclined sliding arm (142) of the drive plate (14).

The wiper blade (32) is always separated from the windshield (A) when the wiper (30) is in the original position so that the user does not need to take any action, and the wiper blade (32) is protected. The design is convenient and prevents the wiper blade (32) from damage without human intervention.

Figure 4:
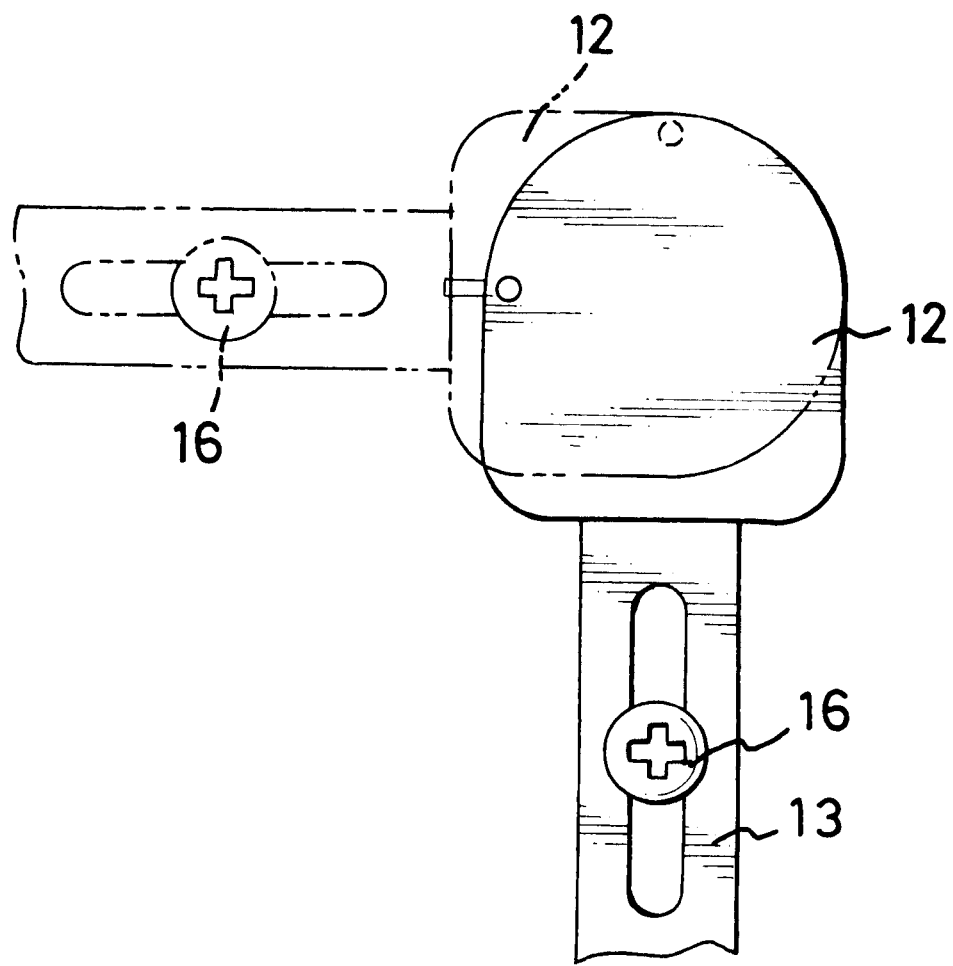
FIG. 4 is an operational front plan view of a protection actuating assembly of the windshield wiper blade protector in FIG. 1.
Figure 5:
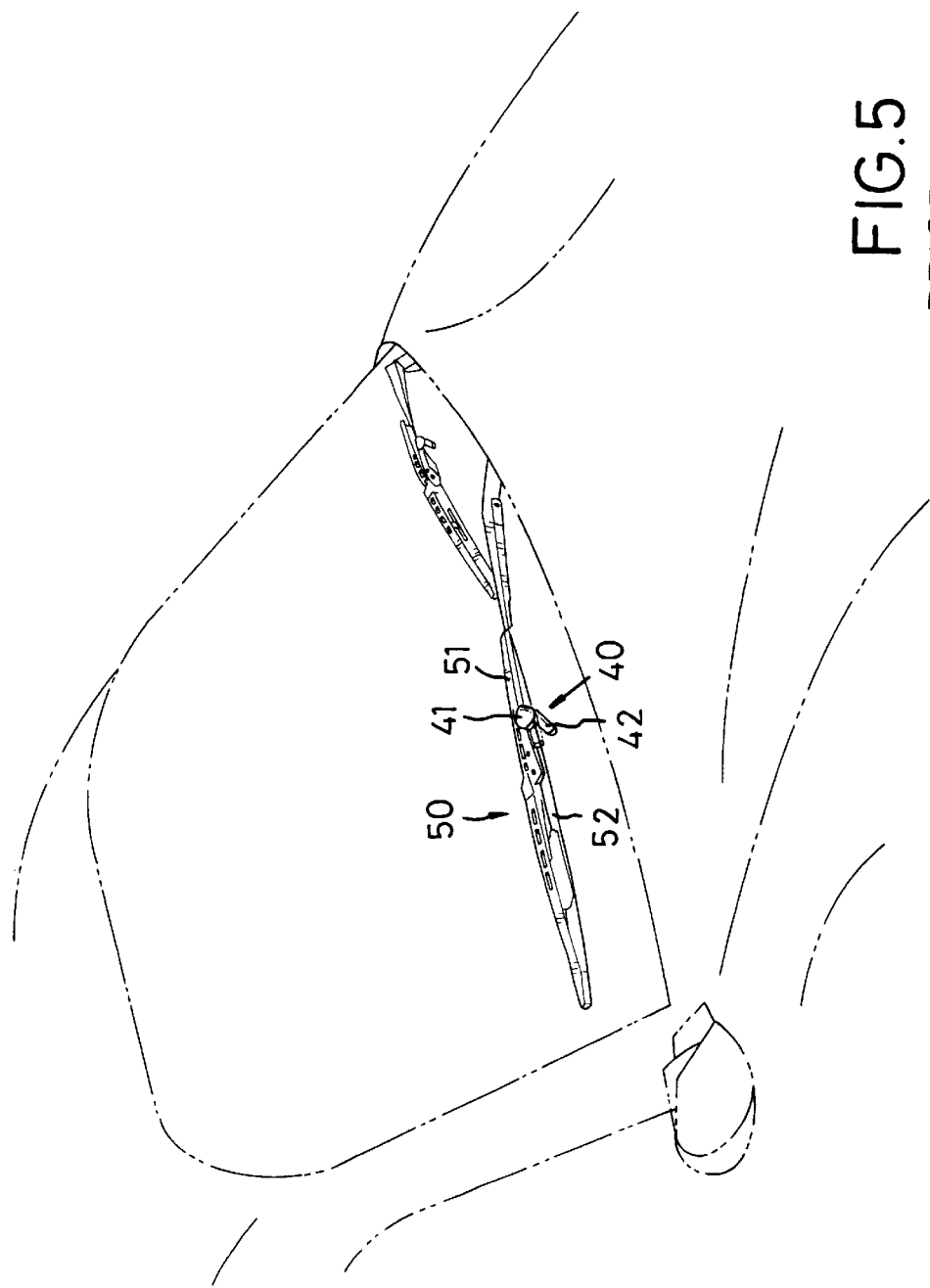
FIG. 5 is an operational perspective view of a conventional windshield wiper blade protector in accordance with prior art.
Figure 6:
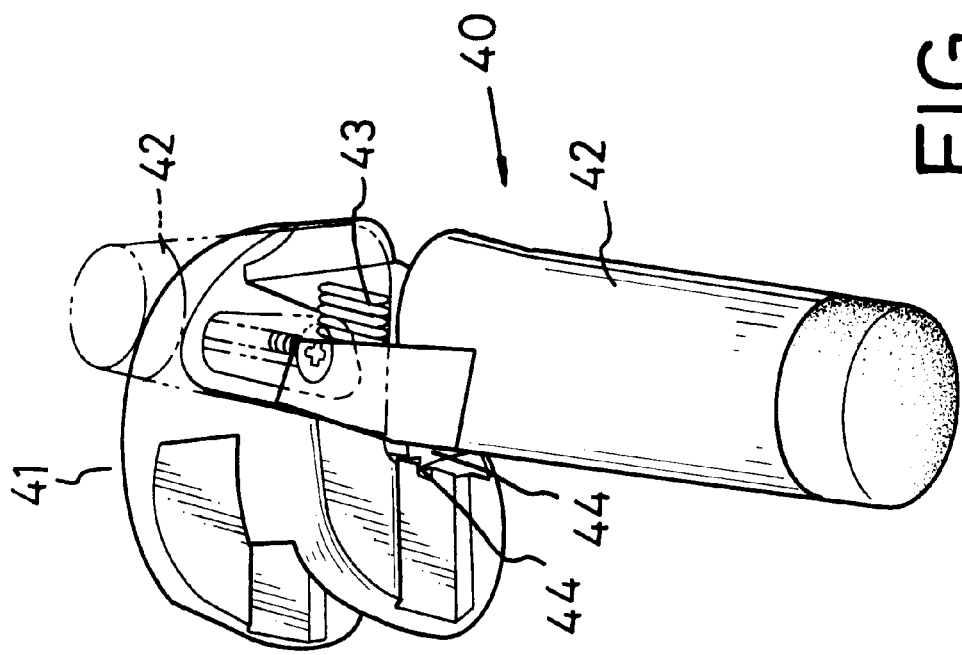
FIG. 6 is a perspective view of the conventional windshield wiper blade protector in FIG. 5.

With reference to FIGS. 2 and 4, a hole (122) is defined in the body (12) and extends and is perpendicular to the flat face (121) of the body (12). The body (12) has a slit (123) defined in an outer periphery of the body (12). The slit (123) is parallel to the hole (122) in the body (12) and communicates with the hole (122). At least two locking holes (112) are defined in the connecting block (11) and extend and are perpendicular to the flat face (111) of the connecting block (11). The locking holes (112) in the connecting block (11) selectively correspond to the hole (122) in the body (12). A spring (125) is compressively mounted in the hole (122) of the body (12), and a locking pin (124) is movably mounted in the hole (122) in the body (12). The locking pin (124) has two opposite ends, one abutting the spring (125) and the other extending into the hole (112) in the connecting block (11) to prevent the body (12) from rotating when the bolt (15) is loosened. A drive pin (126) extends through the slit (123) and is attached radially to the locking pin (124). To prevent the drive plate (14) from contacting the roller (22), the bolt (15) is loosened, and the locking pin (124) is driven to compress the spring (125) and fully move into the hole (122) in the body (12). Consequently, the body (12) can be rotated relative to the connecting block (11) to make the other locking hole (112) align with the locking pin (124) such that the locking pin (124) extends into the other locking hole (112) to lock the body (12) again. With the body (12) in this alternate position, the drive plate (14) never contacts the roller (22) even when the wiper (30) moves back to the original position. Since the temperature during winter is lower than that during summer, the windshield wiper blade protector is unnecessary in winter. Preventing the drive plate (14) from touching the roller (22) can lengthen the using life of the windshield wiper blade protector when the windshield wiper blade protector is unnecessary.

Although the invention has been explained in relation to its preferred embodiment, it is to be understood that many other possible modifications and variations can be made without departing from the spirit and scope of the invention as hereinafter claimed.

What is claimed is:
1. A windshield wiper blade protector comprising:
   a stationary lifting arm comprising:
      a base plate adapted to be attached to a windshield;
      an arm extending up from one side of the base plate; and
      a roller pivotally mounted on a free end of the arm; and
   a protection actuating assembly adapted to be mounted on a wiper and comprising:
      a connecting block adapted to be attached to the wiper;
      a body attached to the connecting block; and
      a drive plate attached to the body, the drive plate having a sliding arm provided to slide on the roller of the stationary lifting arm and a connecting arm extending from one side of the sliding arm opposite to the stationary lifting arm, the sliding arm having a free end projecting upward relative to the windshield and forming an acute angle with the connecting arm;
      wherein the protection actuating assembly and the wiper are lifted up due to the angle of the sliding arm when the wiper is moved to an original position and the sliding arm slides on the roller so that the wiper blade is always detached from the windshield when the wiper is moved to the original position to prevent the wiper blade from damage due a high temperature of the windshield caused by sunshine.

2. The windshield wiper blade protector as claimed in claim 1, wherein the body comprises a tongue extending radially from the body and having a slot longitudinally defined in the tongue, the connecting arm has a threaded hole defined in the connecting arm near the end and a locking bolt is screwed into the threaded hole in the connecting arm of the drive plate after extending through the slot in the tongue to hold the drive plate in place.

3. The windshield wiper blade protector as claimed in claim 2, wherein the connecting block and the body abut each other and are secured by a bolt.

4. The windshield wiper blade protector as claimed in claim 3, wherein the connecting block and the body each comprises a flat face formed to abut each other, the body including:
   a hole defined in the body and extending perpendicular to the flat face of the body;
   a slit defined in an outer periphery of the body, the slit parallel to the hole in the body and communicating with hole;
   a spring compressively mounted in the hole in the body;
   a locking pin movably mounted in the hole in the body to press the spring, the locking pin locking the connecting block and preventing the connecting block from rotating when the bolt is loosened; and
   a drive pin extending through the slit in the body and attached radially to the locking pin to move the locking pin in the hole in the body; and
   the connecting block including at least two locking holes defined in the connecting block and extending perpendicular to the flat face of the connecting block, the locking holes in the connecting block selectively corresponding to the hole in the body to allow the locking pin to extend into the connecting block.

5. The windshield wiper blade protector as claimed in claim 1, wherein the connecting block and the body abut each other and are secured by a bolt.

6. The windshield wiper blade protector as claimed in claim 5, wherein the connecting block and the body each comprises a flat face formed to abut each other, the body including:

a hole defined in the body and extending perpendicular to the flat face of the body;

a slit defined in an outer periphery of the body, the slit parallel to the hole in the body and communicating with the hole;

a spring compressively mounted in the hole in the body;

a locking pin movably mounted in the hole in the body to press the spring, the locking pin locking the connecting block and preventing the connecting block from rotating when the bolt is loosened; and a drive pin extending through the slit in the body and attached radially to the locking pin to move the locking pin in the hole in the body; and the connecting block including at least two locking holes defined in the connecting block and extending perpendicular to the flat face of the connecting block, the locking holes in the connecting block selectively corresponding to the hole in the body to allow the locking pin to extend into the connecting block.

* * * * *